United States Patent
Brown et al.

(10) Patent No.: US 11,477,691 B2
(45) Date of Patent: Oct. 18, 2022

(54) DEDICATED BEARER MANAGEMENT

(71) Applicant: British Telecommunications Public Limited Company, London (GB)

(72) Inventors: Ruth Brown, London (GB); Jonathan Hart, London (GB); Maria Cuevas, London (GB)

(73) Assignee: British Telecommunications Public Limited Company, London (GB)

( * ) Notice: Subject to any disclaimer, the term of this patent is extended or adjusted under 35 U.S.C. 154(b) by 9 days.

(21) Appl. No.: 15/733,673

(22) PCT Filed: Mar. 28, 2019

(86) PCT No.: PCT/EP2019/057864
§ 371 (c)(1),
(2) Date: Sep. 28, 2020

(87) PCT Pub. No.: WO2019/185800
PCT Pub. Date: Oct. 3, 2019

(65) Prior Publication Data
US 2021/0014724 A1 Jan. 14, 2021

(30) Foreign Application Priority Data
Mar. 29, 2018 (EP) .................................. 18165281

(51) Int. Cl.
*H04W 28/02* (2009.01)
*H04W 76/12* (2018.01)
(Continued)

(52) U.S. Cl.
CPC ... *H04W 28/0289* (2013.01); *H04W 28/0284* (2013.01); *H04W 76/12* (2018.02); *H04W 76/15* (2018.02); *H04W 76/18* (2018.02)

(58) Field of Classification Search
CPC . H04W 28/0289; H04W 76/12; H04W 76/15; H04W 76/18; H04W 28/0284
See application file for complete search history.

(56) References Cited

U.S. PATENT DOCUMENTS 8,358,624 B1   1/2013   Ghaus et al.
8,811,594 B1   8/2014   Ganzhorn et al.
(Continued)

FOREIGN PATENT DOCUMENTS

CN   1849805 A    10/2006
CN   101390419 A   3/2009
(Continued)

OTHER PUBLICATIONS

Examination Report under Section 18(3) for Great Britain Application No. 1805321.5, dated Jul. 29, 2020, 3 pages.
(Continued)

*Primary Examiner* — Kibrom T Hailu
(74) *Attorney, Agent, or Firm* — Patterson Thuente IP

(57) ABSTRACT

A method of managing data bearers between a cellular network subscriber device and a packet data gateway in a cellular network core, the cellular network subscriber device and the packet data gateway being connected by a default bearer, the method including receiving at least one dedicated bearer request for a communication session between the cellular network subscriber device and an external network resource; comparing at least one parameter of the received dedicated bearer against a set of predetermined rules; and if at least one parameter of the received dedicated bearer request matches at least one of the set of predetermined rules: storing the at least one parameter of the received dedicated bearer request; and sending a message to the
(Continued)

subscriber device to cause the cellular network subscriber device and packet data gateway to use the default bearer for the communication session.

8 Claims, 6 Drawing Sheets

(51) Int. Cl.
*H04W 76/15* (2018.01)
*H04W 76/18* (2018.01)

(56) References Cited

U.S. PATENT DOCUMENTS

| | | | |
|---|---|---|---|
| 9,210,691 B2 | 12/2015 | Ponukumati et al. | |
| 9,883,436 B2 | 1/2018 | Brown et al. | |
| 10,123,241 B2 | 11/2018 | Brown et al. | |
| 2002/0187780 A1 | 12/2002 | Souissi | |
| 2003/0069018 A1 | 4/2003 | Matta et al. | |
| 2005/0048972 A1 | 3/2005 | Dorenbosch et al. | |
| 2006/0126595 A1 | 6/2006 | Dahm et al. | |
| 2007/0026861 A1 | 2/2007 | Kuhn et al. | |
| 2007/0057843 A1 | 3/2007 | Chang et al. | |
| 2007/0064576 A1 | 3/2007 | Ogata | |
| 2007/0064676 A1 | 3/2007 | Peisa et al. | |
| 2008/0034296 A1 | 2/2008 | Bybee et al. | |
| 2008/0112364 A1 | 5/2008 | Kwon et al. | |
| 2008/0293394 A1 | 11/2008 | Silver et al. | |
| 2009/0156219 A1 | 6/2009 | Kim et al. | |
| 2010/0003994 A1 | 1/2010 | Akiyama | |
| 2010/0291924 A1 | 11/2010 | Antrim et al. | |
| 2011/0026485 A1 | 2/2011 | Lin et al. | |
| 2011/0201336 A1 | 8/2011 | Garrett et al. | |
| 2011/0217979 A1 | 9/2011 | Nas | |
| 2011/0281582 A1 | 11/2011 | Jiang | |
| 2012/0021744 A1 | 1/2012 | Chin et al. | |
| 2012/0069750 A1 | 3/2012 | Xing et al. | |
| 2012/0099429 A1* | 4/2012 | Ludwig | H04W 28/24 370/235 |
| 2012/0122515 A1 | 5/2012 | Han et al. | |
| 2012/0144226 A1 | 6/2012 | Yang et al. | |
| 2012/0208548 A1 | 8/2012 | Park | |
| 2013/0016658 A1* | 1/2013 | Lovsen | H04W 76/19 370/328 |
| 2013/0148574 A1 | 6/2013 | Liu et al. | |
| 2013/0223230 A1 | 8/2013 | Swaminathan et al. | |
| 2013/0237245 A1 | 9/2013 | Tinnakornsrisuphap et al. | |
| 2013/0252660 A1 | 9/2013 | Bach | |
| 2013/0267229 A1 | 10/2013 | Gopalakrishnan | |
| 2013/0303240 A1 | 11/2013 | Sanka et al. | |
| 2013/0337811 A1 | 12/2013 | Faerber et al. | |
| 2014/0066069 A1 | 3/2014 | Salami et al. | |
| 2014/0086159 A1 | 3/2014 | Sajadieh et al. | |
| 2014/0114568 A1 | 4/2014 | Park | |
| 2014/0126406 A1 | 5/2014 | Ibanez et al. | |
| 2014/0162676 A1* | 6/2014 | Shaw | H04W 76/00 455/452.2 |
| 2014/0187243 A1 | 7/2014 | Rune et al. | |
| 2014/0204950 A1* | 7/2014 | Willars | H04L 61/35 370/392 |
| 2014/0233449 A1 | 8/2014 | Laroia et al. | |
| 2014/0341184 A1 | 11/2014 | Dhanda et al. | |
| 2014/0378129 A1 | 12/2014 | Jiang et al. | |
| 2015/0036504 A1 | 2/2015 | McMurry et al. | |
| 2015/0038154 A1 | 2/2015 | Ponukumati et al. | |
| 2015/0063101 A1* | 3/2015 | Touati | H04W 28/0268 370/230 |
| 2015/0085663 A1 | 3/2015 | McMurry et al. | |
| 2015/0097731 A1 | 4/2015 | Russell | |
| 2015/0126187 A1 | 5/2015 | Ponukumati et al. | |
| 2015/0139015 A1 | 5/2015 | Kadous et al. | |
| 2015/0296364 A1 | 10/2015 | Peruru et al. | |
| 2015/0334604 A1 | 11/2015 | Banks et al. | |
| 2016/0021660 A1 | 1/2016 | Krishnamurthy | |
| 2016/0029281 A1 | 1/2016 | Zhou et al. | |
| 2016/0095036 A1 | 3/2016 | Stojanovski et al. | |
| 2016/0112896 A1* | 4/2016 | Karampatsis | H04W 28/0289 370/230.1 |
| 2016/0135222 A1* | 5/2016 | Jain | H04W 74/04 370/329 |
| 2016/0183281 A1 | 6/2016 | Yeh et al. | |
| 2016/0205605 A1 | 7/2016 | Krishnamurthy | |
| 2016/0234760 A1* | 8/2016 | Orlandi | H04W 48/14 |
| 2016/0262200 A1 | 9/2016 | Su | |
| 2016/0295439 A1 | 10/2016 | Yang et al. | |
| 2017/0094628 A1 | 3/2017 | Miao et al. | |
| 2017/0127217 A1 | 5/2017 | Miao et al. | |
| 2017/0230255 A1 | 8/2017 | Joung et al. | |
| 2017/0311210 A1 | 10/2017 | Draznin et al. | |
| 2017/0332301 A1 | 11/2017 | Horn et al. | |
| 2017/0347298 A1 | 11/2017 | Brown et al. | |
| 2018/0262922 A1 | 9/2018 | Mackenzie et al. | |
| 2019/0028983 A1 | 1/2019 | Mackenzie et al. | |
| 2019/0239101 A1 | 8/2019 | Ouyang et al. | |
| 2020/0045559 A1 | 2/2020 | Kim et al. | |
| 2020/0288296 A1 | 9/2020 | Fiorese et al. | |

FOREIGN PATENT DOCUMENTS

| | | |
|---|---|---|
| CN | 101656994 A | 2/2010 |
| CN | 101931891 A | 12/2010 |
| CN | 102164375 A | 8/2011 |
| CN | 102387590 A | 3/2012 |
| CN | 103166949 A | 6/2013 |
| CN | 103460756 A | 12/2013 |
| CN | 104106274 A | 10/2014 |
| CN | 105101164 A | 11/2015 |
| CN | 105247908 A | 1/2016 |
| CN | 105340331 A | 2/2016 |
| CN | 105706501 A | 6/2016 |
| CN | 106464611 A | 2/2017 |
| CN | 106465464 A | 2/2017 |
| CN | 103002005 B | 2/2018 |
| EP | 2434816 A2 | 3/2012 |
| EP | 2605555 A2 | 6/2013 |
| EP | 2857798 A1 | 4/2015 |
| EP | 2750444 A4 | 5/2015 |
| EP | 2991242 A1 | 3/2016 |
| GB | 2559556 A | 8/2018 |
| GB | 2559731 A | 8/2018 |
| GB | 2560754 A | 9/2018 |
| GB | 2560899 A | 10/2018 |
| GB | 2572394 A | 10/2019 |
| JP | 2993087 B2 | 12/1999 |
| JP | 2001209891 A | 8/2001 |
| JP | 2012009948 A | 1/2012 |
| KR | 20100131025 A | 12/2010 |
| WO | WO-9951052 A1 | 10/1999 |
| WO | WO-2007097670 A1 | 8/2007 |
| WO | WO-2009043283 A1 | 4/2009 |
| WO | WO-2009121833 A1 | 10/2009 |
| WO | WO-2010133256 A1 | 11/2010 |
| WO | WO-2011033173 A1 | 3/2011 |
| WO | WO-2011095687 A1 | 8/2011 |
| WO | WO-2014021761 A2 | 2/2014 |
| WO | WO-2014130764 A1 | 8/2014 |
| WO | WO-2015177601 A1 | 11/2015 |
| WO | WO-2015180126 A1 | 12/2015 |
| WO | WO-2016095584 A1 | 6/2016 |
| WO | WO-2016172839 A1 | 11/2016 |
| WO | WO-2017006157 A1 | 1/2017 |
| WO | WO-2018145796 A1 | 8/2018 |
| WO | WO-2018145797 A1 | 8/2018 |
| WO | WO-2018172002 A1 | 9/2018 |
| WO | WO-2018172003 A1 | 9/2018 |
| WO | WO-2019185800 A1 | 10/2019 |

OTHER PUBLICATIONS

International Search Report for Application No. PCT/EP2019/057864, dated May 24, 2019, 3 pages.

(56) References Cited

OTHER PUBLICATIONS

3GPP, "3rd Generation Partnership Project; Technical Specification Group Services and System Aspects; General Packet Radio Services (GPRS) Enhancements for Evolved Universal Terrestrial Radio Access Network (E-UTRAN) Access (Release 15)," 3GPP Standard, Technical Specification; 3GPP TS 23.401, vol. SA WG2, No. V15.3.0, Mar. 27, 2018, XP051450523, pp. 1-405.
3GPP TS 23.122, Generation Partnership Project; Technical Specification Group Core Network and Terminals; Non-Access-Stratum (NAS) functions related to Mobile Station (MS) in idle mode, 3rd Generation Partnership Project (3GPP), Mobile Competence Centre; 650, Route Des Lucioles; F-06921 Sophia-Antipolis Cedex; France, vol. CT WG1, No. V12.9.0, Jun. 24, 2016, XP051295206, (Release 12), 1 page.
3GPP TS 23.401 V15.3.0, "3rd Generation Partnership Project; Technical Specification Group Services and System Aspects; General Packet Radio Service (GPRS) Enhancements for Evolved Universal Terrestrial Radio Access Network," (E-UTRAN) Access (Release 15), Mar. 2018, 405 pages.
3rd Generation Partnership Project; Technical Specification Group Radio Access Network; Evolved Universal terrestrial Radio Access (E-UTRA) and Evolved Universal Terrestrial Radio Access Network (E-UTRAN); Radio interface protocol aspects (Release 7), Oct. 17, 2006, XP050909974, 1 page.
Application and File History for U.S. Appl. No. 15/733,668, filed Sep. 26, 2020, Inventor: Brown, et al.
Application and File History for U.S. Appl. No. 15/733,669, filed Sep. 26, 2020, Inventor: Brown et al.
Application and File History for U.S. Appl. No. 16/487,744, filed Aug. 21, 2019, Inventor: Ramirez.
Application and Filing Receipt for U.S. Appl. No. 16/484,659, filed Aug. 8, 2019, Inventor: Mehran.
Application and Filing Receipt for U.S. Appl. No. 16/484,740, filed Aug. 8, 2019, Inventor: Mehran.
Chandra K., et al., "CogCell: Cognitive Interplay between 60 GHz Picocells and 2.4/5 GHz Hotspots in the 5G Era," IEEE Communications Magazine, May 7, 2015, 14 pages.
Christodoulou C. G., et al., "Reconfigurable Antennas for Wireless and Space Applications," Proceedings of the IEEE, Jul. 2012, vol. 100, No. 7, pp. 2250-2261.
Combined Search and Examination Report under Section 17 and 18(3) for Application No. 1702030.6, dated Jul. 7, 2017, 2 pages.
Combined Search and Examination Report under Sections 17 & 18(3) for Great Britain Application No. 1704702.8, dated Aug. 14, 2017, 2 pages.
Corrected Search Report under Section 17 for Great Britain Application No. GB1702033.0, dated Jun. 29, 2017, 2 pages.
European Search Report for Application No. EP13250127, dated May 20, 2014, 2 pages. (Search Report only).
Examination Report under Section 18(3) for Great Britain Application No. GB1805078.1, dated Aug. 5, 2020, 3 pages.
Examination Report under section 18(3) for Application No. 1702030. 6, dated May 3, 2019, 2 pages.
Examination Report under Section 18(3) for Great Britain Application No. 1704702.8, dated Oct. 22, 2019, 4 pages.
Examination Report Under Section 18(3) for Great Britain Application No. GB1704702.8, dated Jun. 17, 2019, 2 pages.
Extended European Search Report for Application No. 17155116.1, dated Jul. 6, 2017, 8 pages.
Extended European Search Report for Application No. 17155118.7, dated Aug. 29, 2017, 7 pages.
Extended European Search Report for Application No. 17162851.4, dated Sep. 5, 2017, 13 pages.
Extended European Search Report for Application No. 17162854.8, dated Aug. 31, 2017, 18 pages.
First Office Action dated Jan. 19, 2017 for Chinese Application No. 201480068013.0 filed Nov. 19, 2014, 10 pages (including Translation).
Great Britain Combined Search and Examination Report under Sections 17 & 18 (3) for Application No. GB1702033.0, dated Nov. 29, 2017, 1 page.
Great Britain Combined Search and Examination Report Under Sections 17 & 18(3) for Application No. GB1704694.7, dated Aug. 14, 2017, 2 pages.
Great Britain Examination Report under Section 18(3) for Application No. GB1704694.7, dated Jun. 5, 2019, 1 page.
Great Britain Search Report Under Section 17 for Application No. GB1704694.7, dated Aug. 11, 2017, 2 pages.
International Search Report and Written Opinion for Application No. PCT/EP2019/057807, dated May 31, 2019, 15 pages.
International Search Report and Written Opinion for Application No. PCT/EP2019/057808, dated May 31, 2019, 14 pages.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Preliminary Report on Patentability for Application No. PCT/EP2018/054135, dated Oct. 3, 2019, 11 pages.
International Preliminary Report on Patentability for Application No. PCT/GB2014/053426, dated Nov. 13, 2015, 11 pages.
International Search Report and Written Opinion for Application No. PCT/EP2017/082585, dated Apr. 9, 2018, 11 pages.
International Search Report and Written Opinion for Application No. PCT/EP2017/082586, dated Feb. 9, 2018, 9 pages.
International Search Report and Written Opinion for Application No. PCT/EP2018/054134, dated Apr. 5, 2018, 23 pages.
International Search Report and Written Opinion for Application No. PCT/EP2018/054135, dated Apr. 26, 2018, 12 pages.
International Search Report for Application No. PCT/GB2014/053426, dated Feb. 20, 2015, 4 pages.
Legg, P., et al., "Load Balancing and Aggregation Algorithms for LTE Dual Connectivity," 2016 IEEE 83rd Vehicular Technology Conference (VTC Spring), May 15, 2016, 5 pages.
Lesslie R G., et al., "The Application of a Simple Spatial Multi-Criteria Analysis Shell to Natural Resource Management Decision Making," ResearchGate, Jan. 2008, 26 pages.
Office Action For Chinese Application No. 201880011588.7, dated Aug. 2, 2021, 21 pages.
Office Action For Chinese Application No. 201880019173.4, dated Sep. 1, 2021, 9 pages.
Office Action For Chinese Application No. 201980021858.7, dated Jan. 27, 2021, 11 pages.
Office Action For Chinese Application No. 201980021917.0, dated Jan. 25, 2021, 19 pages.
Search Report dated Jan. 9, 2017 for Chinese Application No. 201480068013.0 filed Nov. 19, 2014, 4 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Search Report Under Section 17 for Great Britain Application No. GB1704702.8, dated Aug. 10, 2017, 2 pages.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
Viprinet: Bonding LTE / 4G via LTE Routers—Better Than Load Balancing | LTE /4G, "LTE—We Combine the Latest Mobile Phone Generation!," Jul. 1, 2019, retrieved from https://www.viprinet.com/en/technology/combinable-media/lte-4g, 4 pages.
Yang Z., et al., "Sensor-Assisted Codebook-Based Beamforming for Mobility Management in 60 GHz WLANs," IEEE 12th International Conference on Mobile Ad Hoc and Sensor Systems, 2015, pp. 333-341.

* cited by examiner

DEDICATED BEARER MANAGEMENT

PRIORITY CLAIM

The present application is a National Phase entry of PCT Application No. PCT/EP2019/057864, filed Mar. 28, 2019, which claims priority from EP Patent Application No. 18165281.9, filed Mar. 29, 2018, each of which is hereby fully incorporated herein by reference.

TECHNICAL FIELD

The present disclosure relates to cellular networks and in particular to a method of creating dedicated bearers for UE communications.

BACKGROUND

In wireless communication networks, bearers can be used to identify traffic flows (e.g. IP packet flows) between nodes of the network that have a common quality of service (QoS) requirement. That means, a bearer is an IP packet flow with a defined QoS between two nodes of a network. A bearer may be viewed as a virtual connection between two nodes of the network.

An example of a communication network that uses bearers is the Long Term Evolution (LTE) network.

Default and Dedicated Bearers

EPS bearers can be broadly classified into two types: default bearers and dedicated bearers. Default bearers are established when a UE attaches to the network, and remain established for the duration of the UE's PDN connection. Dedicated bearers may be established at any time subsequent to the establishment of the default bearer. Dedicated bearers may be established to support communication sessions with specific QoS requirements. Dedicated bearers may be of different types, each associated with a respective QoS.

SUMMARY

In one aspect, an embodiment provides a method of managing data bearers between a cellular network subscriber device and a packet data gateway in a cellular network core, the cellular network subscriber device and the packet data gateway being connected by a default bearer, the method comprising: receiving at least one dedicated bearer request for a communication session between the cellular network subscriber device and an external network resource; comparing at least one parameter of the received dedicated bearer against a set of predetermined rules; and if at least one parameter of the received dedicated bearer request matches at least one of the set of predetermined rules: storing the at least one parameter of the received dedicated bearer request; and sending a message to the subscriber device to cause the cellular network subscriber device and packet data gateway to use the default bearer for the communication session.

In another aspect, an embodiment provides a bearer management server for managing data bearers between a cellular network subscribing device and a packet data gateway in a cellular network core, the cellular network subscribing device and the packet data gateway being, in use, connected by a default bearer, comprising: a first data store; a second data store; means for receiving at least one dedicated bearer request for a communication session between the subscriber device and an external network resource; means for comparing at least one parameter of the received dedicated bearer against a set of predetermined rules stored in the first data store; and means for storing the at least one parameter of the received dedicated bearer request in the second data store, in the event that the comparing means determines that at least one parameter of the received dedicated bearer request matches at least one of the set of predetermined rules; and means for sending a message to the subscriber device to cause the subscriber device and packet data gateway to use the default bearer for the communication session.

BRIEF DESCRIPTION OF FIGURES

Embodiments of the present disclosure will now be described with the aid of the accompanying Figures in which.

DETAILED DESCRIPTION

System Overview

Figure 1:
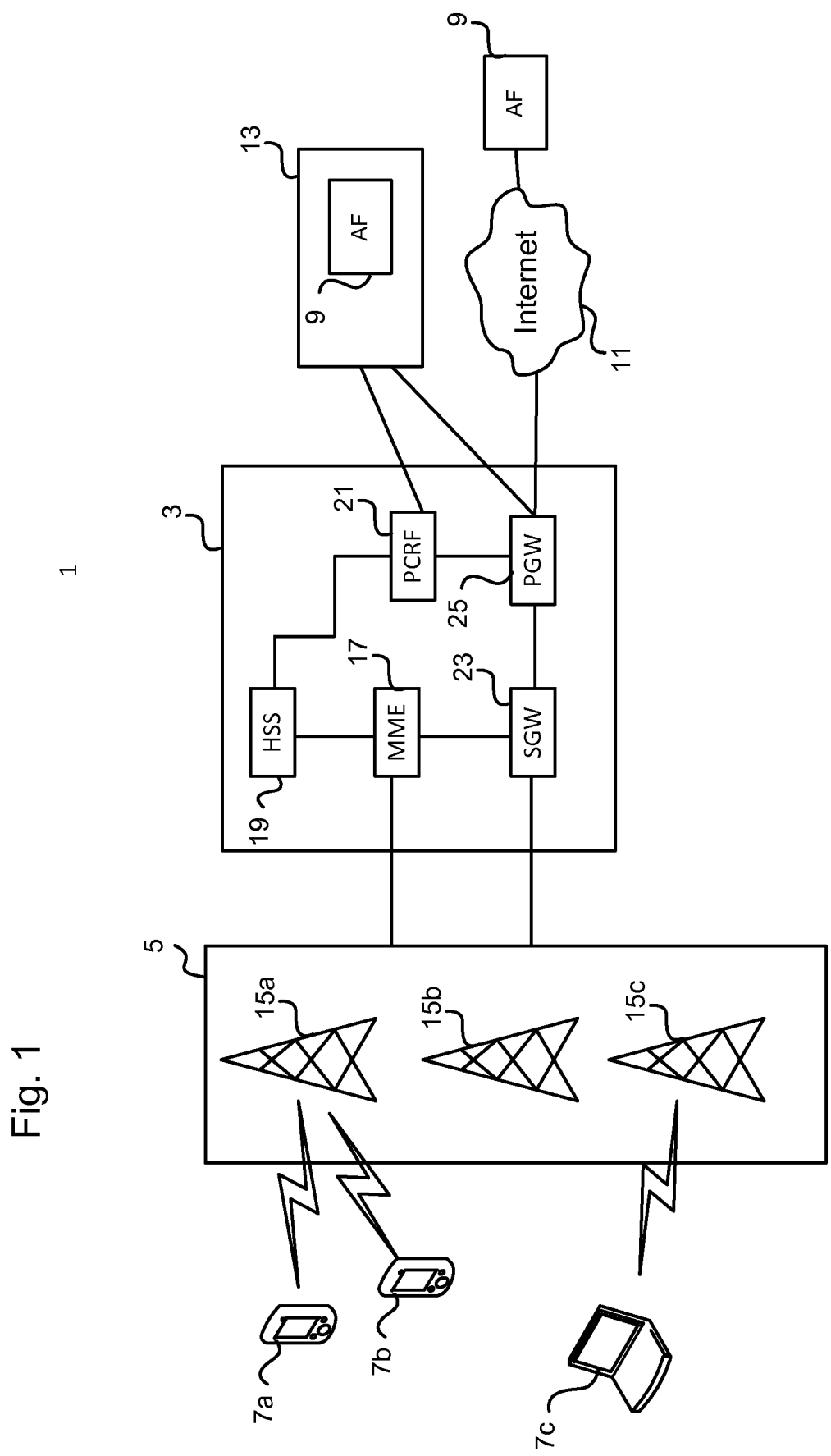
FIG. 1 schematically shows an overview of a system architecture in a first embodiment.

FIG. 1 shows the main system components of a cellular network system according to the first embodiment.

The cellular network 1 system of the first embodiment is a Long Term Evolution (LTE) (alternatively referred to as an Evolved Packet System (EPS)) network formed of an Enhanced Packet Core (EPC) 3 and a radio access network (RAN) 5 for connecting user entities (UE) 7 such as mobile telephones and cellular enabled laptop computers with remote resources known generally as application functions 9 located on external (of the EPC) networks packet data networks (PDN) such as the Internet 11 and Internet Multimedia Sub-system (IMS) 13. Examples of application functions include HTTP websites, file transfer protocol (FTP), VoIP, audio and video streaming, gaming, email, etc.

The RAN 5 is responsible for providing the cellular wireless radio link to UEs 7 and is formed of base stations known as eNodeBs 15, each located in different locations over an area, such as a country, to provide wide geographical coverage. Macrocells, small cells, femtocells and picocells are all examples of eNodeBs which can be present in a RAN 5. Each eNodeB 15 can handle connection requests from multiple UEs and are configured to support handover to enable the UEs to stay connected to the RAN even when they change location. In FIG. 1, a first UE 7a and a second UE 7b are shown connected to a first eNodeB 15a, there are no devices are connected to a second eNodeB 15b and a third UE 7c is connected to a third eNodeB 15c.

The eNodeBs 15 of the RAN are connected to the EPC 3 to provide control plane and data plane connectivity.

The EPC 3 contains control functions such as a Multimedia Mobility Entity (MME) 17, a Home Subscriber Server (HSS) 19, and a Policy Configuration Rules Function (PCRF) 21.

For routing data packets across the network core, the data plane is formed of a Serving Gateway (SGW) 23 connected to the eNodeBs 15 and a Packet Gateway (PGW) 25 connected to external resources such as the Internet 11 and the IMS 13. For ease of explanation a single SGW 23 and PGW 25 are shown, but more than one SGW 23 and PGW 25 may be present.

Evolved Packet System Bearers

In accordance with LTE standards, when a UE 7 wishes to establish data connectivity with a LTE network 1, the UE will connect to an available eNodeB 15 which initiates authentication of the UE using a conventional control plane process involving the MME 17 and HSS 19. Once the UE 7 is authenticated as a permitted subscriber to the LTE network, a number of data plane sessions, known as EPS bearers, are established between the UE 7 and PGW 25 as the UE uses application functions 9.

Evolved Packet System (EPS) bearers are a virtual connection between the UE 7 and the PGW 25. The EPS bearer identifies data (e.g. IP packets) communicated between these two endpoints (i.e. data sent from the UE 7 to the PGW 25 and data sent from the PGW 25 to the UE 7) with specific QoS attributes/requirements. In other words, the EPS bearer uniquely identifies traffic flows (e.g. data packets) that have a common QoS requirement between the UE 7 and the PGW 25. The EPS bearer is a bearer of the LTE network; that is, it connects two endpoints, or nodes (the UE 7 and PGW 25) that are within the LTE network. Similar bearers may be established between the PGW 25 of the LTE network and the external packet data networks 11, 13.

The EPS bearer provides the PDN connectivity service to the UE 7. EPS bearers are typically created on a per-PDN basis; that is, a set of EPS bearers will be established for each PDN the UE 7 is connected to.

Figure 2:
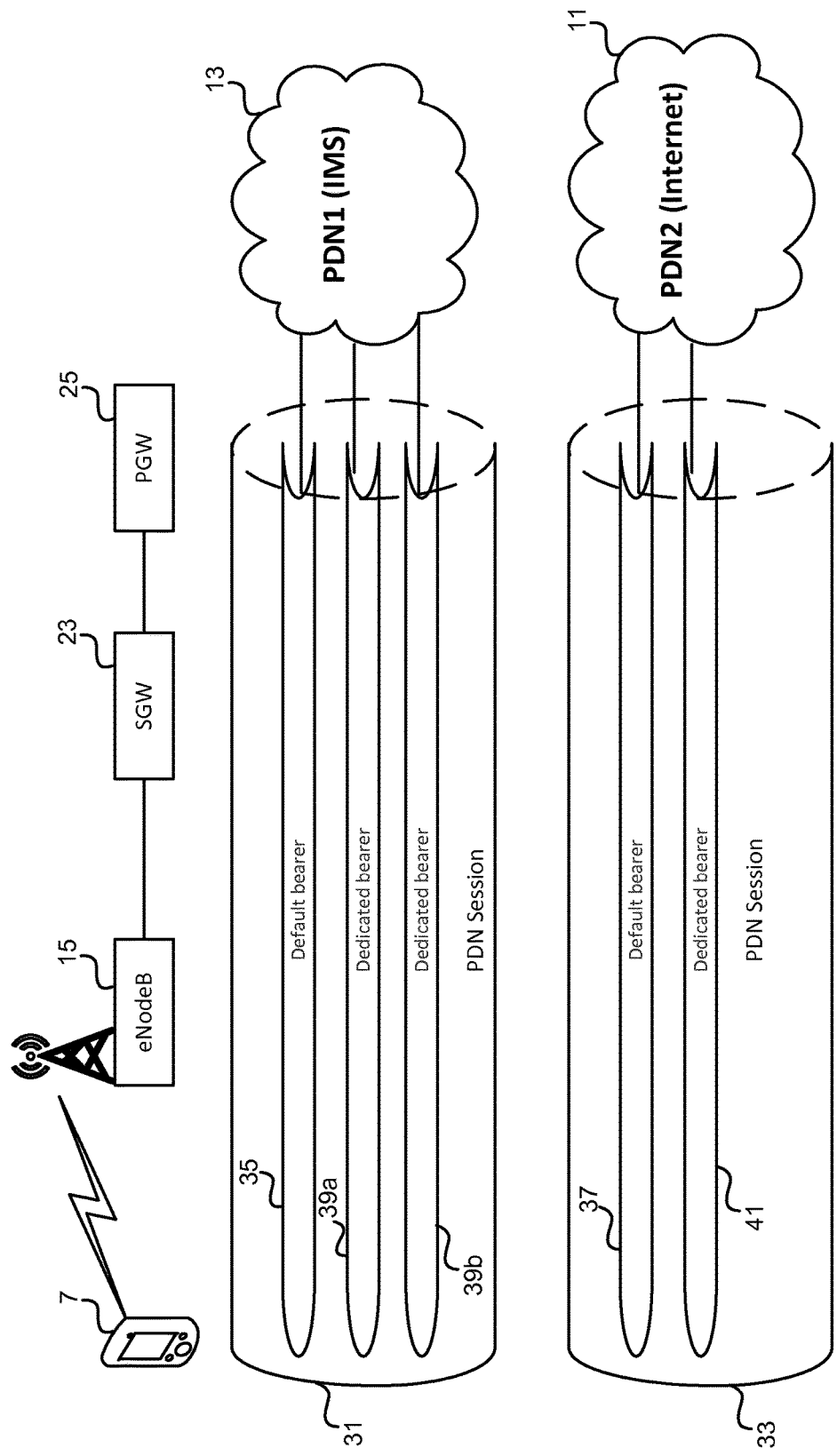
FIG. 2 schematically shows default and dedicated bearers established between a UE and PGW for different external data networks.

FIG. 2 shows an example of bearers associated with a UE when connected to the IMS network 13 and Internet 11 PDNs illustrated in FIG. 1.

A first set of EPS bearers 31 provide a virtual connection between the UE 7 and the Internet 11; and a second set of EPS bearers 33 provide a virtual connection between the UE 7 and the IMS 13.

EPS bearers can be broadly classified into two types: default bearers (e.g. 35 and 37) and dedicated bearers (e.g. 39 and 41). Default bearers are established when a UE attaches to the network, and remain established for the duration of the UE's PDN connection. Dedicated bearers may be established at any time subsequent to the establishment of the default bearer. Dedicated bearers may be established to support communication sessions with specific QoS requirements. Dedicated bearers may be of different types, each associated with a respective QoS. The UE 7 may communicate multiple different types of data over the network, each type of data having different QoS requirements.

As shown in FIG. 2, the set of EPS bearers 31 between the UE 7 and the IMS 13 includes a default bearer 35 and a pair of dedicated bearers 39. The set of EPS bearers 33 between the UE 7 and the Internet 11 includes a default bearer 37 and a dedicated bearer 41.

For example, the UE 7 may be concurrently communicating VoIP and SMS data with an AF 9 in the IMS and communicating web-browsing data with an AF located on the Internet 11. Typically, VoIP data has higher QoS requirements than web-browsing data as VoIP data is more sensitive to delay and latency and has no tolerance to buffering, unlike web-browsing traffic. To support the communication of data having different QoS requirements, different EPS bearer types can be set up, each associated with different type of QoS.

Table 1 shows the QoS Class Identifiers (QCI) used in LTE (TS23.203 section 6.1.7.2) that can be assigned to different data sessions to provide a function of processing different types of traffic with different priority levels.

TABLE 1

| QCI | Resource Type | Priority | Packet delay budget | Packet error loss rate | Example service | Traffic class | CoS | PHB | DSCP |
|---|---|---|---|---|---|---|---|---|---|
| 1 | GBR | 2 | 100 ms | $10^{-3}$ | Voice | Conversational | 5 | EF | 46 |
| 2 | | 4 | 150 ms | $10^{-3}$ | Video Live streaming | | | | |
| 3 | | 3 | 50 ms | $10^{-3}$ | Real time gaming | | | | |
| 4 | | 5 | 300 ms | $10^{-4}$ | Buffered streaming | Streaming | 4 | AF41 | 34 |
| 5 | Non-GBR | 1 | 100 ms | $10^{-4}$ | IMS signaling | | 3 | AF31 | 26 |
| 6 | | 6 | 300 ms | $10^{-4}$ | Video | Interactive | 3 | AF32 | 28 |
| 7 | | 7 | 100 ms | $10^{-3}$ | Voice | | 2 | AF21 | 18 |
| 8 | | 8 | 300 ms | $10^{-4}$ | Video | | 1 | AF11 | 10 |
| 9 | | 9 | 300 ms | $10^{-4}$ | Video | Background | | BE | 0 |

GBR—Guaranteed Bit Rate
QCI—Quality of Service Class Identifier
CoS—Class of Service
PHB—Per-Hop Behavior
EF—Expedited Forwarding
BE—Best effort
DSCP—Differentiated Services Code Point Different PDNs 11, 13 have different QCI levels assigned to their default bearer. For example the Internet PDN 11 default bearer has a QCI of 9 while the IMS 13 default bearer has a QCI of 5 since IMS packets are considered to be a higher priority traffic. This means that IMS traffic being carried across the LTE network in a default bearer will be treated with a higher priority than Internet traffic carried in a default bearer.

Conventionally, when the UE 7 determines that a new data session with an AF 9 is required, a new dedicated bearer request for a particular QCI of dedicated bearer suitable for the purpose of the new data session is sent via the default bearer to the PGW 25. For example, a VoLTE data session would request a dedicated bearer having a QCI of 1, a streaming video data session would request a dedicated bearer having a QCI of 4, while interactive but non-real-time applications such as web browsing, file transfer and basic video streaming may only request dedicated bearers having lower priority QCIs of 6 to 9.

The request is then forwarded by the PGW 25 to the PCRF 21 which determines a QoS level that should be assigned to the data session (to prevent abusive applications from always requesting high priority dedicated bearers regardless of the actual requirements) and subsequently, what type of dedicated bearer is required.

The PCRF 21 then checks whether an existing dedicated bearer for the determined QoS class is already present for that UE 7 and if not, instructs the PGW 25 to establish a new dedicated bearer.

Setting up a dedicated bearer for each UE 7 request incurs signaling overhead which may not be necessary since the default bearer may be capable of transporting the data session packets without error. Therefore in the first embodiment, the operation of the PCRF 21 is modified so that some dedicated bearers are not automatically established when requested. A policy specifies that any received dedicated bearer requests matching predetermined characteristics such as QCI, IP address, etc. are not created. Therefore upon receiving and matching a request, since a dedicated bearer is not created, the PCRF 21 will store details of the dedicated bearer request and then force the UE 7 to use the default bearer for communicate with an AF 9. The PCRF 21 is also modified to be responsive to the congestion status of the eNodeB that the UE is attached to. When the eNodeB indicates that it is congested, the PCRF 21 will cause any previously requested dedicated bearers associated with UEs attached to the congested eNodeB to be established so that certain QCI types of traffic that were force to use the default bearer are then prioritized in light of the eNodeB's limited resources.

With this processing, in the first embodiment, the control plane signaling load of the LTE network is reduced while still being responsive to network conditions.

Figure 3:
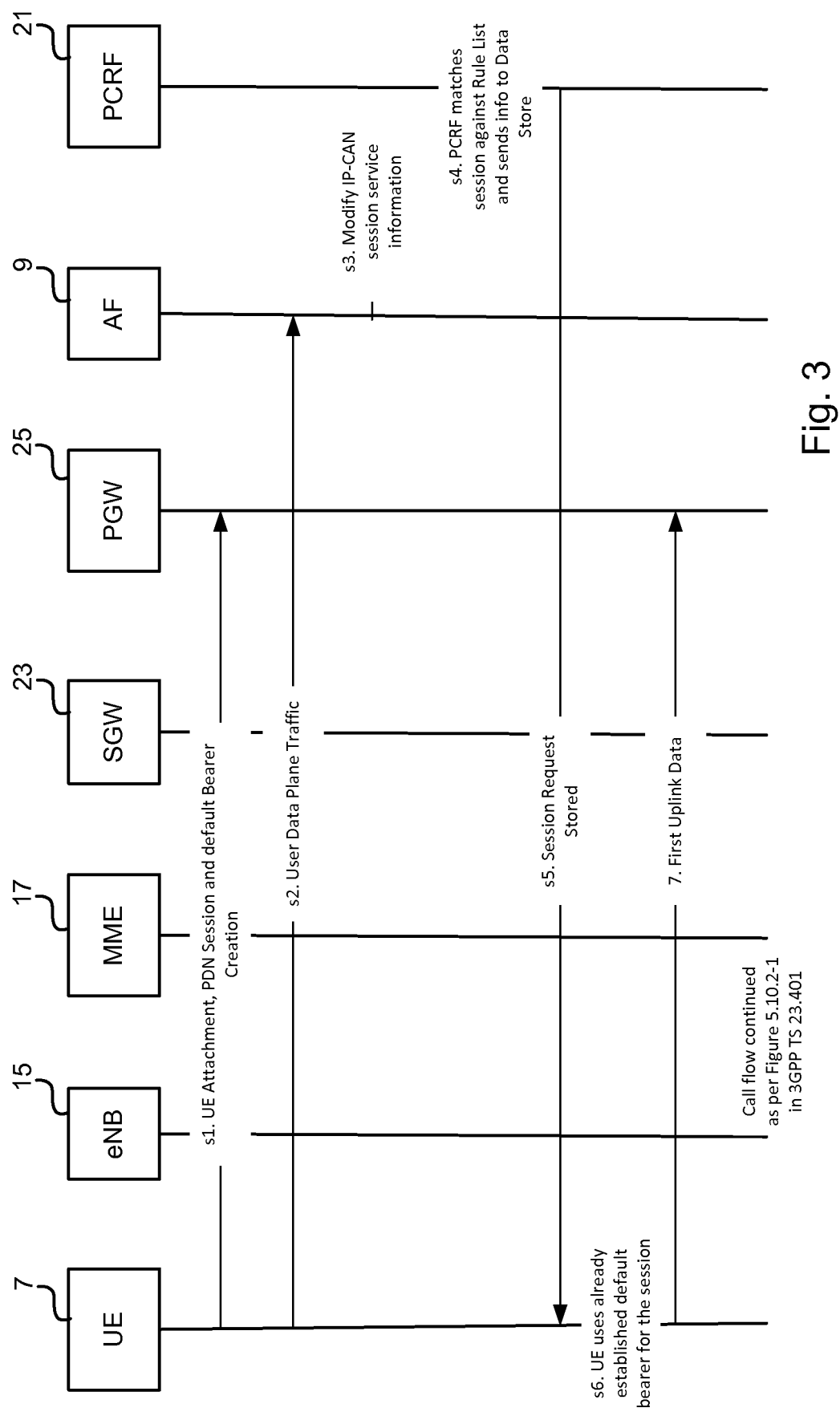
FIG. 3 shows the interaction between various components to defer a dedicated bearer request.

FIG. 3 is a signaling diagram showing the interaction between system components in the first embodiment.

In s1, the UE 7 performs a standard process of attaching to the LTE network including connecting to an eNodeB 15, authenticating, establishing the control plane and PDN session data plane and receiving an IP address. This stage also includes the default bearer creation between the UE 7 and PGW 25 via the eNodeB 15 and SGW 23.

In s2, the UE establishes a communication with an AF that requires a dedicated bearer, for example, the user of the UE 7, initiates a VoLTE call using the dialer application, opens a mobile app for a video streaming service and selects a video for streaming, or opens a photo backup app.

In s3, the AF 9 sends information to modify the Internet Protocol Connectivity Access Network (IP-CAN) session service to the PCRF 21 which represents a network initiated dedicated bearer request.

Although not shown, in other embodiments, the dedicated bearer request can be UE initiated in which case s3 is sent from the UE 7.

Regardless of how the dedicated bearer request is received, in s4, the PCRF 21 of the first embodiment will compare the details of the dedicated bearer request against a set of rules for deferring dedicated bearer setup.

It is recognized that certain types of data session should always be treated as high priority and therefore a dedicated bearer is always required and should be established immediately. These will not be matched against the rules list and therefore the conventional processing to establish a dedicated bearer will be carried out by the LTE network. For example, the VoLTE call would always require a dedicated bearer with a QCI of 1 and therefore the dedicated bearer would always be established.

However, if there is a match, for example to a rule specifying any dedicated bearers having a QCI of between 6 and 8, the details of the dedicated bearer request are stored at the PCRF 21 for later processing. In s5, the PCRF 21 sends a session request stored message to the UE 7 which can be regarded as an instruction to use the default bearer for the issued dedicated bearer request because the session request has been stored and the requested dedicated bearer has not been established. In s6 the UE 7 is configured to use the default bearer for any data packets relating to the data session and in s7 the first data packet since the dedicate bearer session request was issued is sent via the dedicated bearer. The call flow for the rest of the session continues as per FIG. 5.10.2-1 in 3GPP TS 23.401.

With the above processing, control plane signaling in the EPC is reduced by avoiding certain types of dedicated bearer setup. Instead, dedicated bearer session data is transferred using the default bearer that is always active between the UE 7 and PGW 25 while the UE is attached to the LTE network.

The PCRF modification does not permanently reject dedicated bearer requests, instead the operation of the PCRF 21 in initially blocking some dedicated bearer requests, storing the parameters of the request and subsequently establishing a dedicated bearer in the event of eNodeB congestion will be referred to as deferring the dedicated bearer request. In this embodiment, any deferred dedicated bearer requests are only deferred while the eNodeB attached to the UE 7 is not in a congested state.

Figure 4:
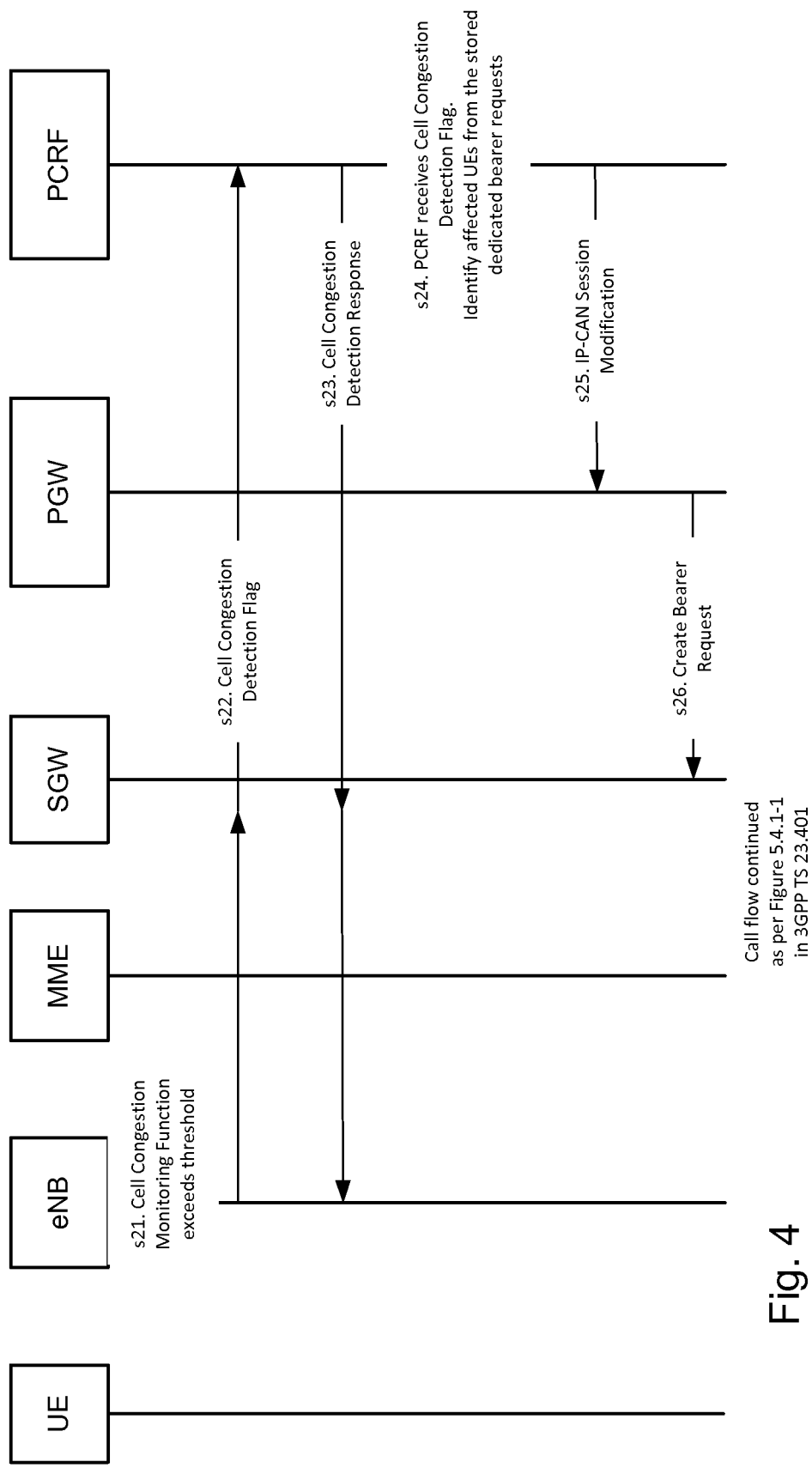
FIG. 4 shows the interaction between the eNodeB and PCRF establish deferred dedicated bearers in response to reported congestion.

FIG. 4 is a process flow showing how a previously deferred dedicated bearer request for a UE can be activated in the event that a UE connected eNodeB determines a congested internal state.

In s21, the eNodeB determines that a congestion level has exceeded a threshold indicating a reduced ability to transport packets from the RAN 5 into the EPC 3. The congestion level may be due a combination of operating conditions such as the number of connected clients, throughput over the air interface, throughput on the EPC link, packet loss, jitter, etc.

Following this detection, in s22 a message is sent from the affected eNodeB 15 to the PCRF 21 containing a cell congestion detection flag. In s23, the message is received at the PCRF 21 and an acknowledgement is sent back to the eNodeB 15.

In s24, the reception of a message containing the cell congestion detection flag is a trigger for establishing at least some of the previously deferred dedicated bearers stored at the PCRF 21 so that the data packets of data sessions associated with the dedicated bearers will be prioritized by the eNodeB for transport during the eNodeB's congested state.

The PCRF 21 therefore identifies the stored dedicated bearers details for all UEs affected by the eNodeB(s) that reported congestion.

Having retrieved the set of deferred dedicated bearers, in s25, the PCRF 21 sends IP-CAN session modification messages to the PGW 25 and in step s26 the PGW establishes a dedicated bearer to the UE 7 via the SGW and congested eNodeB.

For example, returning to FIG. 1, if eNodeB 15*a* reports a congestion status, then the PCRF 21 will identify any deferred dedicated bearer requests associated with the first UE 7*a* and the second UE 7*b* and instruct the PGW to establish dedicated bearers in accordance with those deferred requests.

With the above processing, the PCRF 21 can reduce signaling by deciding that some dedicated bearers requests are not necessary, but still react to eNodeB congestion to prioritize data that would normally be carried across the EPC 3 via a dedicated bearer.

System Components

Now that the overall operation of the system has been described, the components providing the new functionality in the EPC 1 will be discussed.

PCRF

While many of the core components of the EPC 3 are concerned with the aspects of transporting data across the EPC 3 network from a UE 7 to external networks such as the Internet 11 and IP Multimedia Subsystem 13, the PCRF 21 is responsible for service management and control of the LTE service from a higher network layer perspective.

The PCRF 21 contains policies for managing how data transported across the network should be handled as well as how the user should be billed for their usage.

Examples of transport policies include Quality of Service used to determine which types of traffic should be prioritized for transport over the EPC, or user prioritization where a premium customer's traffic can be prioritized. An example of charging policies include differentiating between home network traffic and roaming traffic, or identifying that a user's tariff allows them to stream video data without charge when using a particular application.

Figure 5:
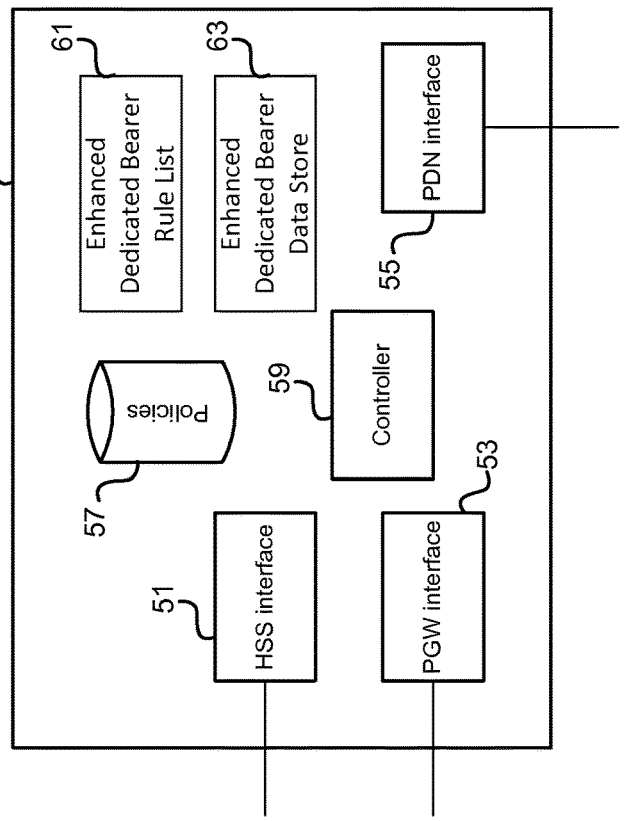
FIG. 5 schematically shows the components of a PCRF.

As shown in FIG. 5, the PCRF 21 contains a HSS interface 51 to the HSS 19, a PGW interface 53 to the PGW 25, a PDN interface 55 to the IMS 13 and Internet 11, a policy database 57 and a PCRF controller 59. In the first embodiment, the PCRF 21 also includes an enhanced dedicated bearer rule list 61 and an enhanced dedicated bearer data store 63.

The Enhanced Dedicated Bearer Rule List 59 is a list of criteria used to identify types of dedicated bearer that the network operator policy has determined should not be established, instead data to be carried within those types of dedicated bearer should be transported using the default bearer. For example the criteria may specify Application ID (Video, Gaming), Destination IP Address, QCI Value, User Group (Premium Subscribers, Business Users), etc.

Enhanced Dedicated Bearer Rule List Parameters can include:
  QCI Value
  Application ID
  Destination IP Address
  Protocol ID
  Port Number
  User Group
  International Mobile Subscriber Identity (IMSI)

Examples of the types of rules stored in the Enhanced Dedicated Bearer Rule List include:
  [Application ID 1]=Video
  [Application ID 2]=Gaming
  [QCI Value 1]=3
  [QCI Value 2]=7
  [Destination IP Address 1]=212.34.23.243
  [Destination IP Address 2]=101.65.12.43
  [Destination IP Address 3]=156.21.84.32

A match between the parameters of an incoming dedicated bearer request and any of the rules stored in the enhanced dedicated bearer rule list 61 indicates a dedicated bearer establishment request that should not be granted (session data should be transported via the default bearer) and instead can be deferred. Any incoming requests for a dedicated bearer request are processed by the PCRF controller 59 against the rules list 61 for dedicated bearer requests which can be deferred in accordance with the first embodiment.

Once an incoming dedicated bearer request has matched an entry in the Enhanced Dedicated Bearer Rule List 61 in the PCRF 21, any session information relating to the dedicated bearer setup is stored in the Enhanced Dedicated Bearer Data Store 63.

As described earlier, some classes of dedicated bearer traffic cannot be deferred due to QCI requirements. Therefore, in order to coexist with the current Dedicated Bearers routines used in current LTE systems, if the dedicated bearer request does not match an entry in the Enhanced Dedicated Bearer Rule List 61, the request is treated conventionally and the PCRF 21 initiates the procedure of dedicated bearer establishment for the session in the usual manner.

Figure 6:
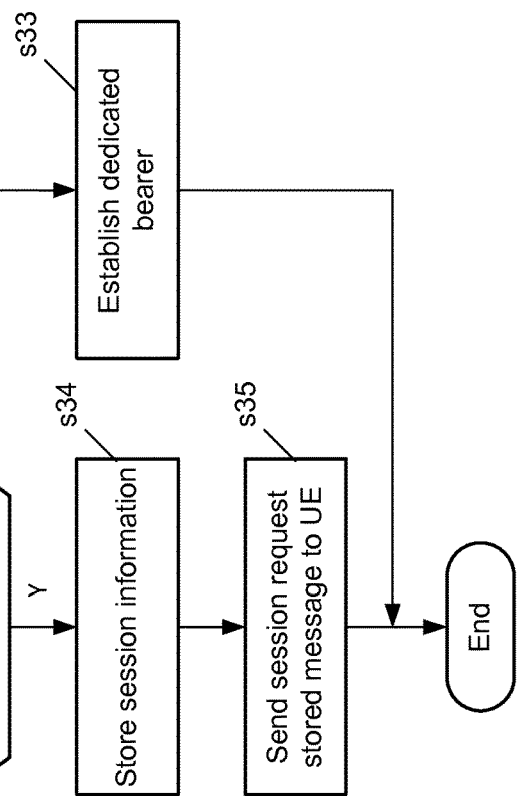
FIG. 6 is a flowchart showing the operation of the PCRF controller when a dedicated bearer request is received.

Details of each matched and deferrable dedicated bearer request are stored in the Enhanced Dedicated Bearer Data Store 63. In this embodiment, the received dedicated bearer request is a conventional Activate Dedicated EPS Bearer Context Request message having the following contents:
  Information Element
  Cell ID
  IMSI
  Protocol discriminator
  EPS bearer identity
  Procedure transaction identity
  Activate dedicated EPS bearer context request message identity
  Linked EPS bearer identity
  Spare half octet
  EPS QoS
  Traffic Flow Template (TFT)
  Transaction identifier
  Negotiated QoS
  Negotiated Logical Link Control Service Access Point Identifier (LLC SAPI)
  Radio priority
  Packet flow Identifier
  Protocol configuration options
  WLAN offload indication
  Network Based IP Flow Mobility (NBIFOM) container
  Extended protocol configuration options For completeness, FIG. 6 is a flowchart showing the operation of the PCRF controller 59 in the first embodiment to provide enhanced operation when a request for a dedicated bearer is received via either the UE 7 or the AF 9.

In s31, the controller 59 determines the characteristics/properties of the dedicated bearer request and loads the enhanced dedicated bearer rules list.

In s32, the controller 59 compares the request characteristics against the policy in the enhanced dedicated bearer rule list 61 to determine if there is a match.

If there is no match, then the request is for a high priority dedicated bearer which cannot be deferred and therefore in s33 the conventional processes are performed to establish the dedicated bearer and the requested QCI class.

If there is a match, then in s34 the dedicated bearer request can be deferred. In s34 the controller 59 stores the session information in the enhanced dedicated bearer data store 63 and in s35 sends a message to the UE to indicate that traffic related to the requested dedicated bearer request should be sent using the default bearer.

eNodeB

Figure 7:
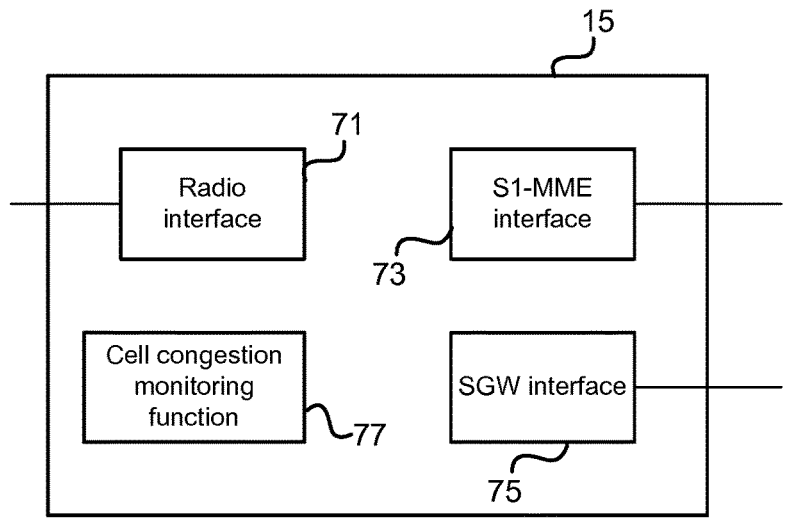
FIG. 7 schematically shows the components of an eNodeB.

FIG. 7 shows the components of an eNodeB in the first embodiment.

The eNodeB 15 provides a connection between UEs and the EPC 3. Each eNodeB 15 contains a radio interface 71 for communication with UEs 7, an S1-MME interface 73 connected to the MME 17, a SGW interface 75 connected to the SGW 23. In the first embodiment, the eNodeB 15 also contains a cell congestion monitoring function 77.

Figure 8:
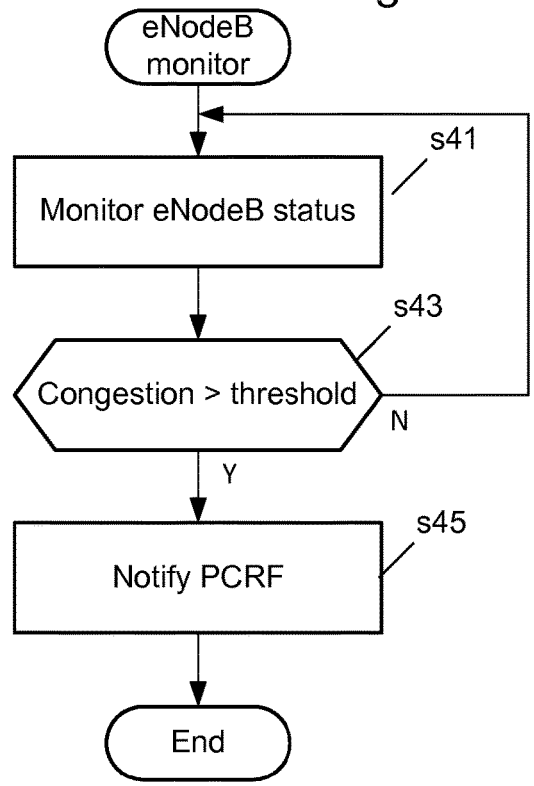
FIG. 8 is a flowchart showing the operation of the eNodeB to report congestion.

FIG. 8 shows the processing of the cell congestion monitoring function 77. In s41 the status of the eNodeB is monitored. The metrics measured include a combination of:

Number of users/session per cell
Cell CPU utilization
Traffic Throughput

Periodically, at s43, the monitored metrics are compared with a threshold or set of thresholds, for example:

Connected users>50
CPU>70%
Throughput>50 Mbs

In this embodiment s43 is performed every 120 seconds to provide a balance between responsiveness and monitoring overhead.

If at least one threshold is considered to be met, then in s45 a 'Cell Congestion Detection Flag' is sent to the PCRF 21. If the status is below the threshold, then processing returns to step s41.

Figure 9:
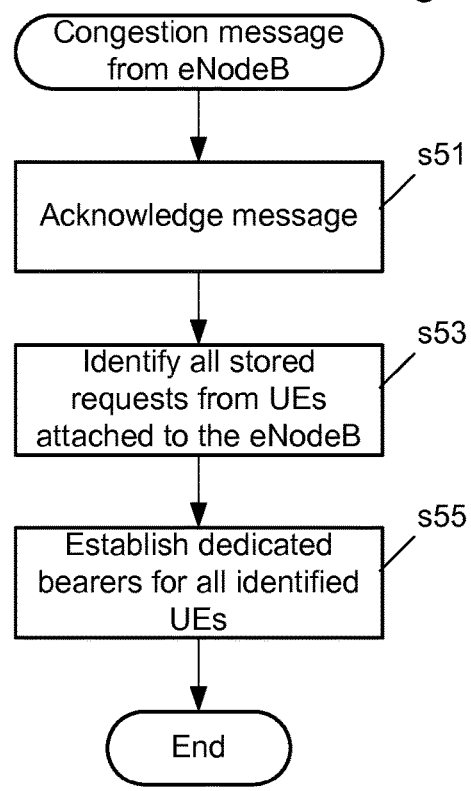
FIG. 9 is a flowchart showing the operation of the PCRF to establish deferred dedicated bearers in response to reported congestion at the eNodeB servicing some deferred dedicated bearers.

FIG. 9 shows the processing of the PCRF controller 59 when a 'Cell Congestion Detection Flag' is received.

In s51 the flagged message from the UE 7 is acknowledged by sending a reply to the UE 7. The controller 59 then accesses the data store 63 and in s53 identifies any deferred dedicated bearer requests of UEs which are affected by the congested status of the eNodeB. In s55, any identified dedicated bearers for UEs attached to the congested eNodeB 15 are established in accordance with the parameters of the stored dedicated bearer request in order of priority based on QCI. In this way, the highest priority dedicated bearers are established ahead of lower priority dedicated bearers.

If, at the later time, the eNodeB 15 reports that it is no longer congested, in this embodiment, any established dedicated bearers which were originally deferred, are not released but instead are allowed to continue until the data session has ended and is released by the UE in a conventional manner.

ALTERNATIVES AND MODIFICATIONS

In the embodiment, the PCRF contains rules which are applicable to all of the eNodeBs. In a modification, different rule sets are applied to sets of eNodeBs, for example different rules sets for macrocells and femtocells.

In the embodiment, the rules are stored at the PCRF and used to match incoming requests for dedicated bearers. In an alternative, the UE stores a set of rules and applies them before sending the request for a dedicated bearer. In this way, the UE can send a request containing a dedicated bearer request flag so that the PCRF can store the dedicated request.

In the embodiment, the PCRF defers matching requests for dedicated bearers and instructs the UE to use the default bearer until a congestion state is reported by the eNodeB connected to the UE.

In an alternative, the PCRF receives regular reports on eNodeB status and when a request is received, the eNodeB status is checked. If the eNodeB is congested, then a dedicated bearer which should be deferred is established.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of managing data bearers between a cellular network subscriber device and a packet data gateway in a cellular network core, the cellular network subscriber device and the packet data gateway being connected by a default bearer, the method comprising:

receiving at least one dedicated bearer request for a communication session between the cellular network subscriber device and an external network resource;

comparing at least one parameter of the at least one received dedicated bearer request against a set of predetermined rules;

if the at least one parameter of the at least one received dedicated bearer request matches the at least one of the set of predetermined rules:

storing the at least one parameter of the at least one received dedicated bearer request, sending a message to the cellular network subscriber device to cause the cellular network subscriber device and packet data gateway to use the default bearer for the communication session, receiving a notification that a base station serving the cellular network subscriber device is experiencing congestion;

retrieving the stored at least one parameter of the at least one received dedicated bearer request; and causing a respective dedicated bearer for the cellular network subscriber device to be established in accordance with the stored at least one parameter of the at least one received dedicated bearer request.

2. The method according to claim 1, further comprising instructing the packet data gateway to establish the dedicated bearer.

3. The method according to claim 1, wherein the set of predetermined rules define conditions for not establishing a dedicated bearer.

4. The method according to claim 1, wherein the at least one parameter comprises at least one of network load or available network processing resources.

5. The method according to claim 1, further comprising, if the at least one parameter of the received dedicated bearer request does not match at least one of the set of predetermined rules, instructing the packet data gateway to establish the dedicated bearer in accordance with the at least one parameter of the dedicated bearer request.

6. A bearer management server for managing data bearers between a cellular network subscribing device and a packet data gateway in a cellular network core, the cellular network subscribing device and the packet data gateway being, in use, connected by a default bearer, comprising:

a first data store;

a second data store;

means for receiving at least one dedicated bearer request for a communication session between the cellular network subscribing device and an external network resource;

means for comparing at least one parameter of the received at least one dedicated bearer request against a set of predetermined rules stored in the first data store;

means for storing the at least one parameter of the received dedicated bearer request in the second data store, in the event that the comparing means determines that at least one parameter of the received dedicated bearer request matches the at least one of the set of predetermined rules;

means for sending a message to the cellular network subscribing device to cause the cellular network subscribing device and packet data gateway to use the default bearer for the communication session;

means for receiving a notification that a base station serving the cellular network subscribing device is experiencing congestion;

means for retrieving the stored at least one parameter of the received dedicated bearer request from the second data store; and means for causing a respective dedicated bearer for the cellular network subscribing device to be established in accordance with the stored at least one parameter of the received dedicated bearer request.

7. The bearer management server according to claim 6, further comprising means for instructing the packet data gateway to establish the dedicated bearer.

8. The bearer management server according to claim 6, wherein the set of predetermined rules defines conditions for not establishing a dedicated bearer.

* * * * *

UNITED STATES PATENT AND TRADEMARK OFFICE
CERTIFICATE OF CORRECTION

| | | |
|---|---|---|
| PATENT NO. | : 11,477,691 B2 | |
| APPLICATION NO. | : 15/733673 | |
| DATED | : October 18, 2022 | |
| INVENTOR(S) | : Ruth Brown | |

It is certified that error appears in the above-identified patent and that said Letters Patent is hereby corrected as shown below:

In the Drawings

Sheet 3 of 6, FIG. 3, delete "7." and insert -- S7. --, therefor.

In the Specification

In Column 2, Line 26, delete "PCRF establish" and insert -- PCRF to establish --, therefor.

In Column 5, Line 49, delete "were force" and insert -- were forced --, therefor.

In Column 6, Line 56, delete "due a" and insert -- due to a --, therefor.

In the Claims

In Column 11, Claim 1, Line 9, delete "congestion;" and insert -- congestion, --, therefor.

In Column 11, Claim 1, Line 11, delete "request; and" and insert -- request, and --, therefor.

Signed and Sealed this
Eleventh Day of April, 2023

Katherine Kelly Vidal
*Director of the United States Patent and Trademark Office*